United States Patent
Nasirov et al.

(10) Patent No.: US 11,522,704 B1
(45) Date of Patent: Dec. 6, 2022

(54) ENCRYPTED DATA MANAGEMENT SYSTEM

(71) Applicant: INTUIT INC., Mountain View, CA (US)

(72) Inventors: Olla Nasirov, Tel Aviv (IL); Noam Kachko, Ramat Gan (IL); Michael Gvirtzman, Ashdod (IL); Yair Tayeb, Petah Tikva (IL); Gleb Keselman, Modiin-Maccabim-Reut (IL); Sergey Banshats, Petah Tikva (IL)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 17/815,715

(22) Filed: Jul. 28, 2022

(51) Int. Cl.
  *H04L 29/06* (2006.01)
  *H04L 9/32* (2006.01)
  *G06F 21/62* (2013.01)
  *H04L 9/14* (2006.01)

(52) U.S. Cl.
  CPC ............ *H04L 9/3213* (2013.01); *G06F 21/62* (2013.01); *H04L 9/14* (2013.01)

(58) Field of Classification Search
  CPC .......... H04L 9/3213; H04L 9/14; G06F 21/62
  See application file for complete search history.

(56) References Cited

U.S. PATENT DOCUMENTS

| 11,044,257 | B1* | 6/2021 | Heuts | H04L 63/108 |
| 2003/0084171 | A1* | 5/2003 | de Jong | H04L 67/34 |
| | | | | 709/229 |
| 2018/0007059 | A1* | 1/2018 | Innes | G06F 21/6218 |
| 2021/0194949 | A1* | 6/2021 | Kuhn | H04L 67/02 |

* cited by examiner

*Primary Examiner* — Jason K Gee
(74) *Attorney, Agent, or Firm* — Patterson & Sheridan, LLP (57) ABSTRACT

Aspects of the present disclosure provide techniques for encrypted data management. Embodiments include determining an encrypted data item in a data store that is related to a request from a data consuming user. Embodiments include determining a data owning user and an encryption key that correspond to the encrypted data item based on a key identifier associated with the encrypted data item. Embodiments include determining one or more additional encrypted data items and one or more additional encryption keys that correspond to the data owning user based on key identifiers associated with the one or more additional encrypted data items. Embodiments include generating a single data access ticket comprising information about the data consuming user, the data owning user, the encryption key, and the one or more additional encryption keys.

20 Claims, 5 Drawing Sheets

| CONSUMER | OWNER | KEY(S) |
|---|---|---|
| EDANIEL | BJOHN | KEYID312; KEYID318; KEYID350 |
| EDANIEL | MGERARD | KEYID368; KEY374 |
| EDANIEL | EEINHORN | KEYID384; KEYID388; KEYID390; KEYID396 |

ENCRYPTED DATA MANAGEMENT SYSTEM

INTRODUCTION

Aspects of the present disclosure relate to techniques for encrypted data management that involve grouping data access requests by data consuming user and data owning user to manage such data access requests in a resource-efficient and auditable manner.

BACKGROUND

Every year millions of people, businesses, and organizations around the world use software applications for a wide variety of purposes. In many cases, sensitive information may be processed and transmitted by software applications in order to provide various functions, such as management of health information, finances, schedules, employment records, and the like. Sensitive information, such as personally identifiable information (PII), is protected by various laws and regulations, and must generally be protected from unauthorized access by software purveyors and associated parties. As such, information processed and transmitted by software applications is often encrypted, and access to the encrypted information is generally restricted based on access control policies. For example, a user that "owns" an item of encrypted data (e.g., the user that created or otherwise controls the item of encrypted data) may grant permission to another user to "consume" the item of encrypted data, and such permission may result in an access control policy that grants the consuming user access to an encryption key for use in accessing the encrypted data.

In many cases, management of data access requests related to encrypted data can be inefficient and can result in undue delays. For example, sending an access request to a data owning user every time a data consuming user requests access to any individual item of encrypted data owned by the data owning user can result in a large amount of access requests and corresponding utilization of computing resources and time.

As such, there is a need in the art for improved techniques for managing access requests related to encrypted data in software applications.

BRIEF SUMMARY

Certain embodiments provide a method for encrypted data management. In one embodiment, a method includes: determining an encrypted data item in a data store that is related to a request from a data consuming user; determining a data owning user and an encryption key that correspond to the encrypted data item based on a key identifier associated with the encrypted data item; determining one or more additional encrypted data items and one or more additional encryption keys that correspond to the data owning user based on key identifiers associated with the one or more additional encrypted data items; generating a single data access ticket comprising information about the data consuming user, the data owning user, the encryption key, and the one or more additional encryption keys; sending a single request to the data owning user based on the single data access ticket to confirm or deny access for the data consuming user to the encryption key and the one or more additional encryption keys; receiving, from the data owning user, a response to the single request; and creating an access policy based on the response.

Other embodiments provide a method for encrypted data management. In one embodiment, the method comprises: receiving a request from a data consuming user to scan a data store for encrypted data; scanning the data store by a plurality of nodes in parallel based on the request; determining a data owning user and a plurality of encryption keys that correspond to a plurality of encrypted data items based on key identifiers determined during the scanning; generating a single data access ticket comprising information about the data consuming user, the data owning user, and the plurality of encryption keys; sending a single request to the data owning user based on the single data access ticket to confirm or deny access for the data consuming user to the plurality of encryption keys; receiving, from the data owning user, a response to the single request; and creating an access policy based on the response.

Other embodiments provide: an apparatus operable, configured, or otherwise adapted to perform the aforementioned method as well as those described elsewhere herein; a non-transitory, computer-readable media comprising instructions that, when executed by a processor of an apparatus, cause the apparatus to perform one or more of the aforementioned methods as well as those described elsewhere herein; a computer program product embodied on a computer-readable storage medium comprising code for performing one or more of the aforementioned methods as well as those described elsewhere herein; and an apparatus comprising means for performing one or more of the aforementioned methods as well as those described elsewhere herein. By way of example, an apparatus may comprise a processing system, a device with a processing system, or processing systems cooperating over one or more networks.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure relate to encrypted data management.

In certain embodiments, access requests related to encrypted data are managed in a unified, efficient, and auditable manner based on grouping encryption keys according to data consuming users and data owning users. When encrypted data is added to a data store managed by a data access management system described herein, it may be stored in association with key identifiers that uniquely identify encryption keys associated with the encrypted data. Subsequently, when a data consuming user submits a request related to accessing encrypted data from the data store, the data access management system scans all data in the data store to identify all encryption keys identified by key identifiers stored in association with encrypted data items in the data.

The data access management system groups the identified encryption keys based by data owning user such that all encryption keys owned by a given data owning user are grouped together, and stores the grouped encryption keys in association with the data owning user and the data consuming user that submitted the request. As such, the data access management system is able to create a single data access ticket for each applicable data owning user with respect to the data consuming user, and the single data access ticket may allow a single data access request to be sent to a given data owning user asking whether to grant the data consuming user access to all encryption keys owned by the data owning user. The data owning user may respond to the single data access request with a decision granting or denying access to all or a subset of encryption keys indicated in the request, and this decision may allow a data access policy to be created accordingly. The single data access ticket may be updated to reflect the decision, allowing for simplified auditing of data access requests and decisions.

Techniques described herein avoid computing resource utilization and time associated with sending multiple data access requests to a given data owning user for each separate encryption key owned by the data owning user when requested by a data consuming user. Thus, compared to conventional techniques in which access to each encryption key is separately requested, embodiments of the present disclosure result in a data access management system that utilizes fewer computing resources such as processing, memory, and network resources, thereby improving the functioning of computing devices involved. Furthermore, by unifying all encryption keys owned by a given data owning user into a single data access ticket associated with a particular data consuming user, techniques described herein reduce unnecessary processing and memory resources associated with generating and storing separate data access requests for each encryption key, and improve auditability of the data access management system by allowing data access decisions to be reviewed in a simple unified form. Additionally, embodiments of the present disclosure improve a user experience of a software application in which encrypted data is stored and transmitted by reducing the number of separate data access requests that data owning users are required to review and address, and by reducing delays associated with accessing encrypted data that would be otherwise caused by the generation and processing of separate data access requests for each encryption key.

Example Computing Environment

Figure 1:
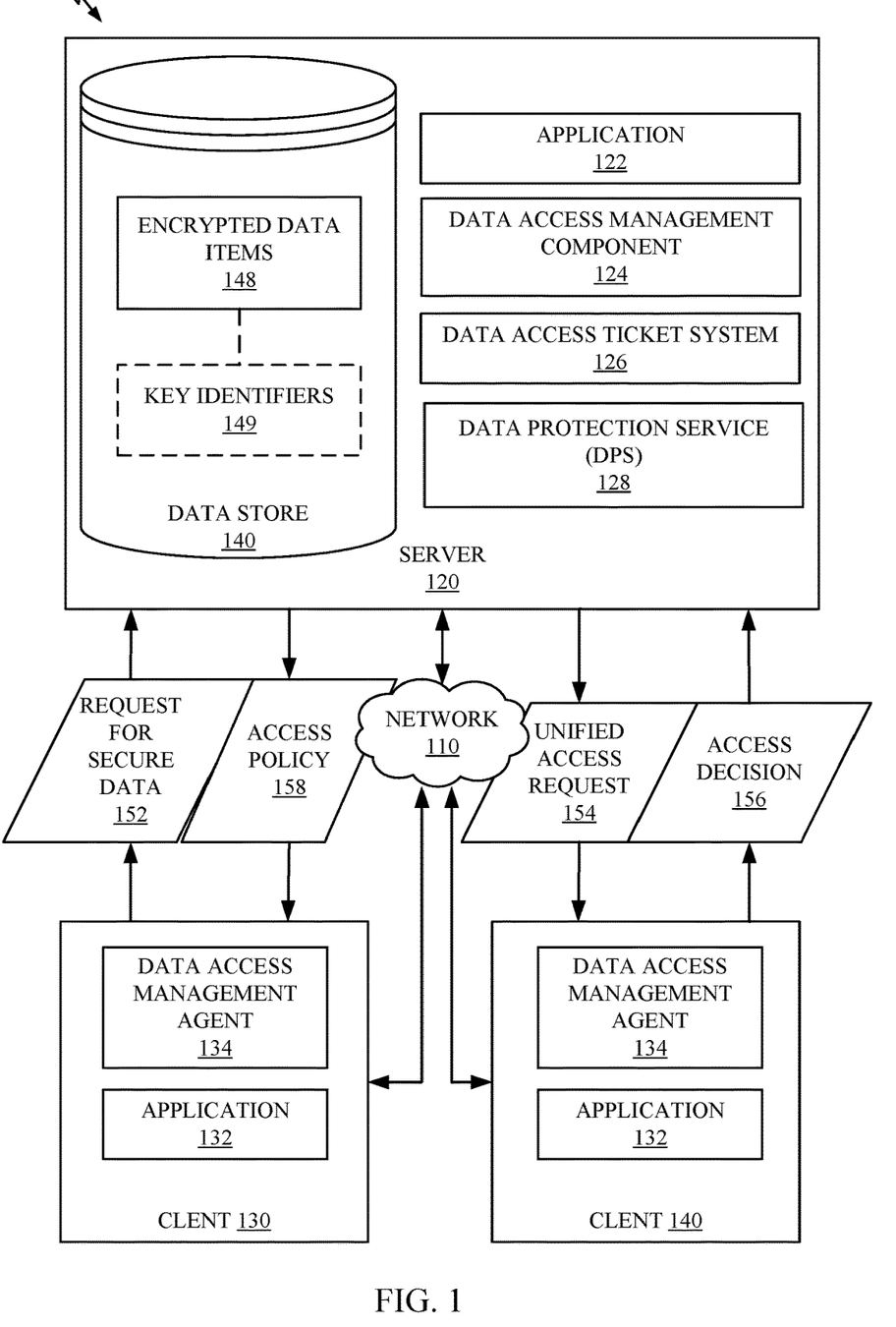
FIG. 1 depicts an example computing environment for encrypted data management.

FIG. 1 illustrates an example computing environment 100 for encrypted data management.

Computing environment 100 includes a server 120 and clients 130 and 140 connected over network 110. Network 110 may be representative of any type of connection over which data may be transmitted, such as a wide area network (WAN), local area network (LAN), cellular data network, and/or the like.

Server 120 includes an application 122, which generally represents a computing application that a user interacts with over network 110 via client 130 or 140. In some embodiments, application 122 is accessed via a user interface associated with client 130 or 140.

According to one embodiment, application 122 is an electronic financial accounting system that assists users with tax return preparation or other financial accounting practices. Application 122 can be a standalone system or, alternatively, can be integrated into other software or service products provided by a service provider. In some embodiments, application 122 is not a financial management application, and performs other functions.

Data related to application 122 is stored in data store 140. For instance, application 122 may store encrypted data items 148 in data store 140. Data related to application 122 may include content that is created and/or shared by users of application 122, and some of that content may include sensitive data that is encrypted to produce encrypted data items 148. In one example, encrypted data items 148 include financial documents associated with users of application 122.

Data access management component 124 performs certain operations related to encrypted data management described herein, and may communicate with data access management agents 134 on client devices such as clients 130 and 140. For example, at data storage time (e.g., when each encrypted data item 148 is added to data store 140), application 122 (e.g., in cooperation with data protection service 128) may store a corresponding key identifier 149 in association with each encrypted data item 148 (e.g., as metadata), the key identifier 149 being a unique identifier of an encryption key associated with the encrypted data item 148. Key identifiers 149 may be referred to in some embodiments as key attribution values. In one example, a key identifier 149 is a six-byte string that functions as an identifier of an encryption key and is used to retrieve an encryption key from a service such as data protection service (DPS) 128. In an embodiment, application 122 receives key identifiers 149 from DPS 128 (e.g., which may store encryption keys used to encrypt data and manage access to the encryption keys) and stores the key identifiers 149 in association with encrypted data items 148 at storage time.

At data access time (e.g., when a user, such as a user of client 130 that has a particular user role, requests access to one or more encrypted data items 148 via application 132), data access management agent 134 (or, in alternative embodiments, data access management component 124) may scan the data related to application 122 in data store 140 to identify all encrypted data items 148 and associated key identifiers 149. In some embodiments, as described in more detail below with respect to FIG. 2, data access management agent 134 may scan subsets of the data in parallel via one or more nodes, and key identifiers 149 identified by the nodes may be aggregated at a master node. Data access management agent 134 may group all identified key identifiers 149 by data owning user such that key identifiers 149 of all keys owned by a given data owning user are grouped together. In some embodiments, as described in more detail below with respect to FIG. 3, data access management agent 134 stores each group of key identifiers 149 in association with an identifier of the data owning user that owns the key identifiers 149 in the group and an identifier of the data consuming user that submitted the request and for whom the scan is being performed. Data access management agent 134 may then send a request 152 to data access management component 124 for access to the keys identified during the scan, such as identifying the user and/or the user's role in the request along with the key identifiers and, in some embodiments, the data owning users and/or projects associated with the key identifiers.

According to certain embodiments, data access management component 124 creates a single data access ticket via data access ticket system 126 (e.g., via an application programming interface (API) exposed by data access ticket system 126) for each given data owning user with respect to the data consuming user, the ticket being used to manage requesting access to the encryption keys owned by the given data owning user on behalf of the data consuming user. In an example, a unified access request 154 is generated by data access ticket system 126 for a given data owing user, and is sent to a client 140 associated with the given data owning user (e.g., to data access management agent 134). Unified access request 154 is a request to grant the data consuming user access to one or more encryption keys owned by the data owning user. In some embodiments, the request is displayed to the data owning user via a user interface (e.g., provided by application 132) accessed on client 140. In one example, the request displayed on client 140 indicates the encryption keys for which access is being requested, such as by indicating the encrypted data items 148 to which the encryption keys correspond (e.g., "User John Doe is requesting access to the following encrypted data items: 2021W2.pdf; revised1098.pdf; budgetestimateJun2022.xls. Would you like to grant the requested access to all or some of these items?"). The data owning user may respond to the request, resulting in an access decision 156 being sent from client 140 to server 120 (e.g., from data access management agent 134 to data access management component 124 and/or data access ticket system 126). Access decision 156 indicates whether to grant the data consuming user access to all or a subset of the encryption keys identified in unified access request 154.

Access decision 156 results in one or more policies being created on server 120 and/or client 130. In an example, DPS 128 creates a policy that allows or denies access for the data consuming user to some or all of the encryption keys indicated in unified access request 154 according to access decision 156. In the example depicted in FIG. 1, an access policy 158 is also pushed to client 130, such as to data access management agent 134. Access policy 158 may allow data access management agent 134 on client 130 to retrieve some or all of the encryption keys owned by the data owning user associated with client 130 (e.g., according to access decision 156) from DPS 128. DPS 128 will, upon request, provide a given encryption key to data access management agent 134 (as one or more policies allow), and data access management agent 134 will use the encryption key to decrypt a given encrypted data item 148 as needed. For example, the data consuming user may attempt to open the file "revised1098.pdf" via application 132 on client 130, data access management agent 134 may retrieve the encrypted document from data store 140, retrieve the encryption key for the document from DPS 128 and decrypt the document (e.g., if such permission was granted via access decision 156), and the document may be displayed to the data consuming user within application 132. If access decision 156 granted access to all of the data owning user's encrypted data items, then the data consuming user may access any of these encrypted data items without the need for separate data access requests to be sent and approved for each item.

The single data access ticket created for the data owning user associated with client 140 and the data consuming user associated with client 130 is updated to reflect access decision 156. Data access ticket system 126 generally maintains data access tickets that allow data access requests to be managed, documented, and audited. For example, an auditing entity may retrieve the single data access ticket to confirm details of unified access request 154 and access decision 156, such as to verify that the data owning user approved access by the data consuming user to one or more particular encryption keys.

It is noted that while data access management component 124, data access ticket system 126, DPS 128, and data store 140 are depicted as separate components, one or more of these components may also be implemented together or separately, as part of application 122 or separately from application 122, and/or may be located on the same device or two or more separate devices. Similarly, data access management agent 134 and application 132 on clients 130 and/or 140 may be implemented together or separately.

In alternative embodiments, some or all of the logic described with respect to server 120 may be implemented on client 130 and/or 140, and/or some or all of the logic described with respect to client 130 and/or 140 may be implemented on server 120. In some embodiments, all of the logic described herein is implemented on a single device.

It is noted that particular examples described herein, such as those related to particular types of software applications (e.g., financial management applications), are not limiting, and techniques described herein may be utilized with different types of software applications, different types of encrypted data, and/or for different purposes.

Example Parallel Processing Scheme for Encrypted Data Access Management

Figure 2:
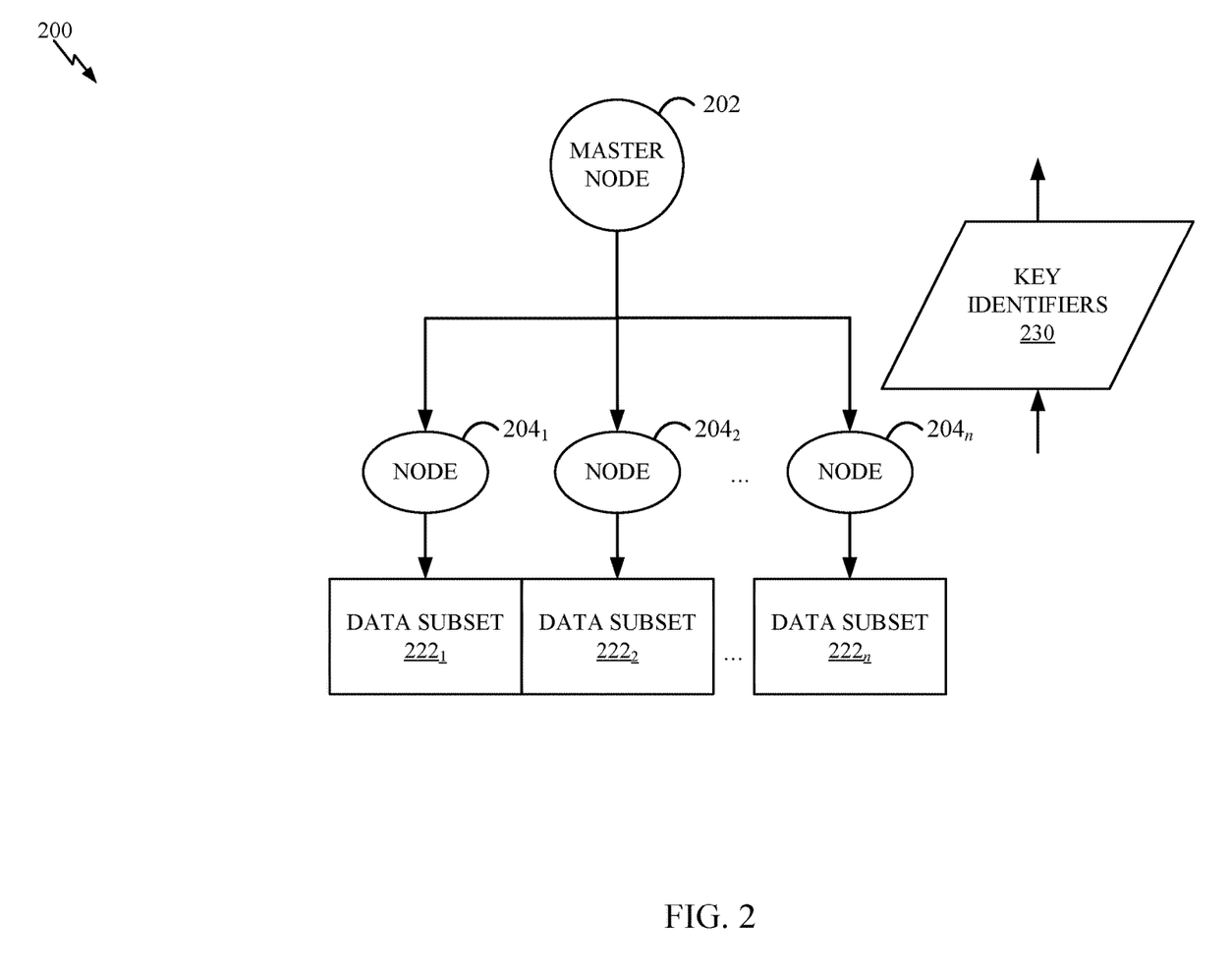
FIG. 2 depicts an example processing scheme related to encrypted data management.

FIG. 2 depicts an example processing scheme 200 related to encrypted data management. For example, processing scheme 200 may be performed by data access management agent 134 and/or data access management component 124 of FIG. 1.

A plurality of nodes $204_{1-n}$ (which may be referred to collectively as nodes 204 and individually as node 204) represent separate software components that scan data sets for encrypted data items and associated key identifiers. In some embodiments, nodes 204 are distributed across separate threads of a physical processing device and/or across separate physical processing devices. In one example, each node 204 runs on a separate thread of a physical processor or a separate physical processor.

Data subsets $221_{1-n}$ (which may be referred to collectively as data subsets 204 and individually as data subset 204) represent separate subsets of a data set to be scanned for encrypted data and associated key identifiers. For example, data associated with application 122 of FIG. 1 stored in data store 140 of FIG. 1 may be divided into n subsets to produce data subsets 221. In one example, each data subset 222 is of a particular size, and n is determined based on how many subsets of the particular size are present in the data set. In another example, n is a configured parameter, and the data set is divided into n subsets of equal size. These methods of dividing a data set into data subsets are included as examples, and other methods are possible without departing from the scope of the present disclosure.

Each node $204_i$ scans a respective data subset $222_i$ and determines all key identifiers that are associated with encrypted data items stored in the respective data subset $222_i$. In some embodiments, nodes 204 scan data subsets 222 in parallel. All key identifiers 230 that are identified by each of nodes 204 are provided to a master node 202, which aggregates the key identifiers 230. Master node 202 is a software component (e.g., that runs on a separate processor thread or processor from nodes 204).

Master node 202 may aggregate key identifiers 230 (e.g., all key identifiers identified by all nodes 202) and send them to data access management component 124 of FIG. 1 to be grouped by data owning user, such as grouping all key identifiers that are owned by a given data owning user together in association with an identifier of the given data owning user. In one embodiment, data access management component 124 communicates with DPS 128 of FIG. 1 to determine which data owning user owns each key identifier. In some embodiments, data access management component 124 also determines which project each key identifier belongs to, and groups key identifiers by project in addition to and/or instead of data owning user. For example, data access management component 124 may group key identifiers of a given data owning user into sub-groups based on project. A project may encompass one or more particular tasks and/or topics. For example, "John Doe's 2021 tax return preparation" may be a project. Thus, a unified data access request to a data owning user (e.g., John Doe) may indicate one or more projects (e.g., John Doe's 2021 tax return preparation) for which access is being requested on behalf of a data consuming user.

Example Grouping of Key Identifiers for Encrypted Data Access Management

Figure 3:
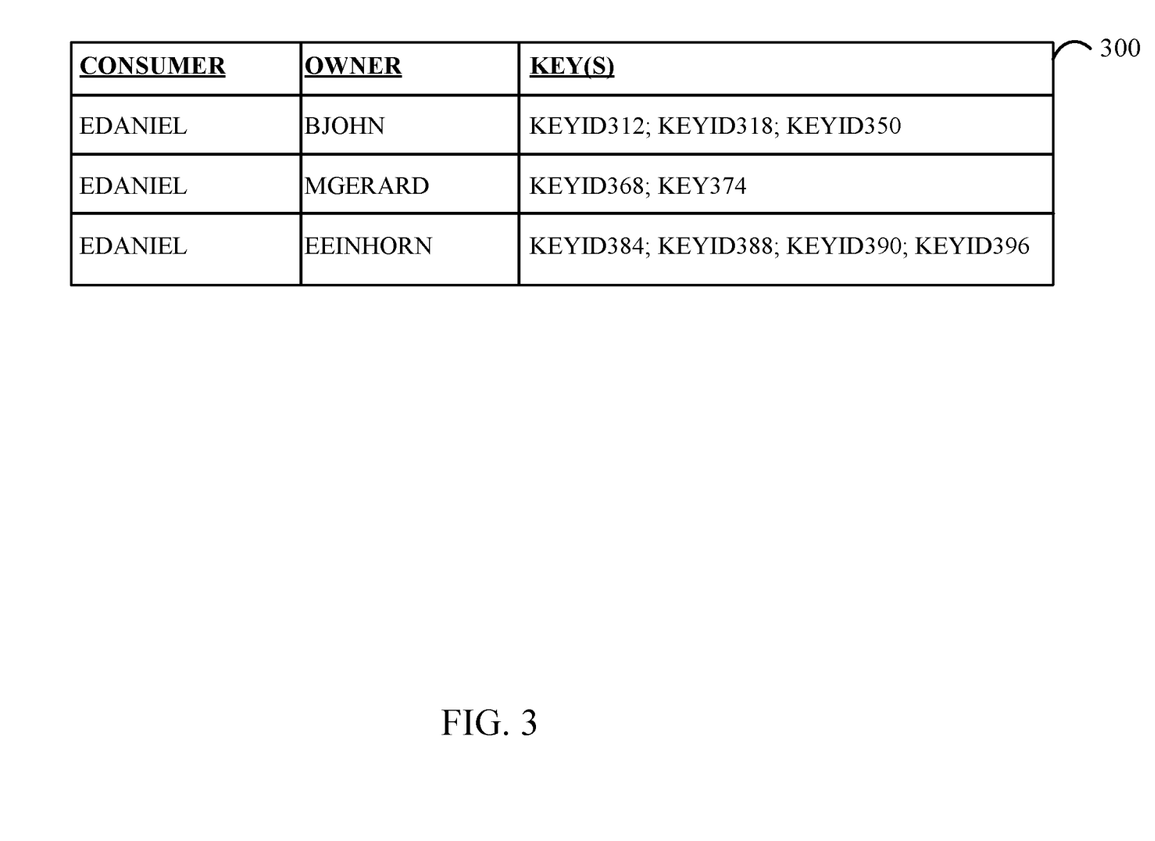
FIG. 3 depicts an example of results of scanning a data set related to encrypted data management.

FIG. 3 is a table 300 illustrating an example grouping of key identifiers as a result of scanning a data set for encrypted data access management. For example, table 300 may represent results of the scanning performed via the processing scheme 200 of FIG. 2.

In table 300, a data consuming user having a user identifier "EDANIEL" is associated with a request to scan a data set for all of encryption keys to which access may be requested on behalf of the data consuming user. The data set is scanned, and a number of key identifiers are determined, including KEYID312, KEYID318, KEYID350, KEYID368, KEYID374, KEYID384, KEYID388, KEYID390, and KEYID396. These key identifiers are included as examples, and represent key identifiers that may be, for example, six-byte strings that uniquely identify encryption keys.

The key identifiers are grouped by data owning user ("owner") in table 300. For example, the first row of table 300 associates the user identifier of the data consuming user for whom the scan is being performed (EDANIEL) with a user identifier of a given data owning user (BJOHN) and all key identifiers owned by data owning user BJOHN (KEYID312, KEYID318, and KEYID350). The second row associates EDANIEL with another data owning user MGERARD and all key identifiers owned by data owning user MGERARD (KEYID368 and KEYID374). The third row associates EDANIEL with yet another data owning user EEINHORN and all key identifiers owned by data owning user EEINHORN (KEYID384, KEYID388, KEYID390, and KEYID396).

A respective access request ticket may be created based on the associations indicated in each row of table 300, and a unified access request may be sent to each data owning user in table 300 requesting access on behalf of EDANIEL to all keys owned by that data owning user. For example, a single data access ticket is generated for the combination of EDANIEL and BJOHN, and includes details of KEYID312, KEYID318, and KEYID350. A unified access request is then sent to BJOHN requesting a decision of whether to grant EDANIEL access to some or all of the keys identified by KEYID312, KEYID318, and KEYID350. BJOHN may respond to unified request granting or denying access to some or all of the keys, and the single data access ticket may be updated accordingly. One or more access policies are also generated based on the decision, such as in DPS 128 and/or data access management agent 134 of FIG. 1, the one or more policies allowing or denying EMOORE access to some or all of the keys identified by KEYID312, KEYID318, and KEYID350.

It is noted that while table 300 only depicts a small number of keys for each of a small number of data owning user for the purposes of illustration, there may actually be a large number of keys for each of a large number of data owning users (e.g., hundreds or thousands of keys and/or users). As such, techniques described herein for improved encrypted data access management may result in significant increases in computing performance and a significant reduction in delays associated with requesting access to encryption keys. Furthermore, parallel processing schemes, such as those described with respect to FIG. 2 may result in additional performance improvements by allowing a data set to be scanned for key identifiers more quickly and in a manner that does not overload any individual processing thread and/or processing device.

Example Operations for Encrypted Data Management

Figure 4:
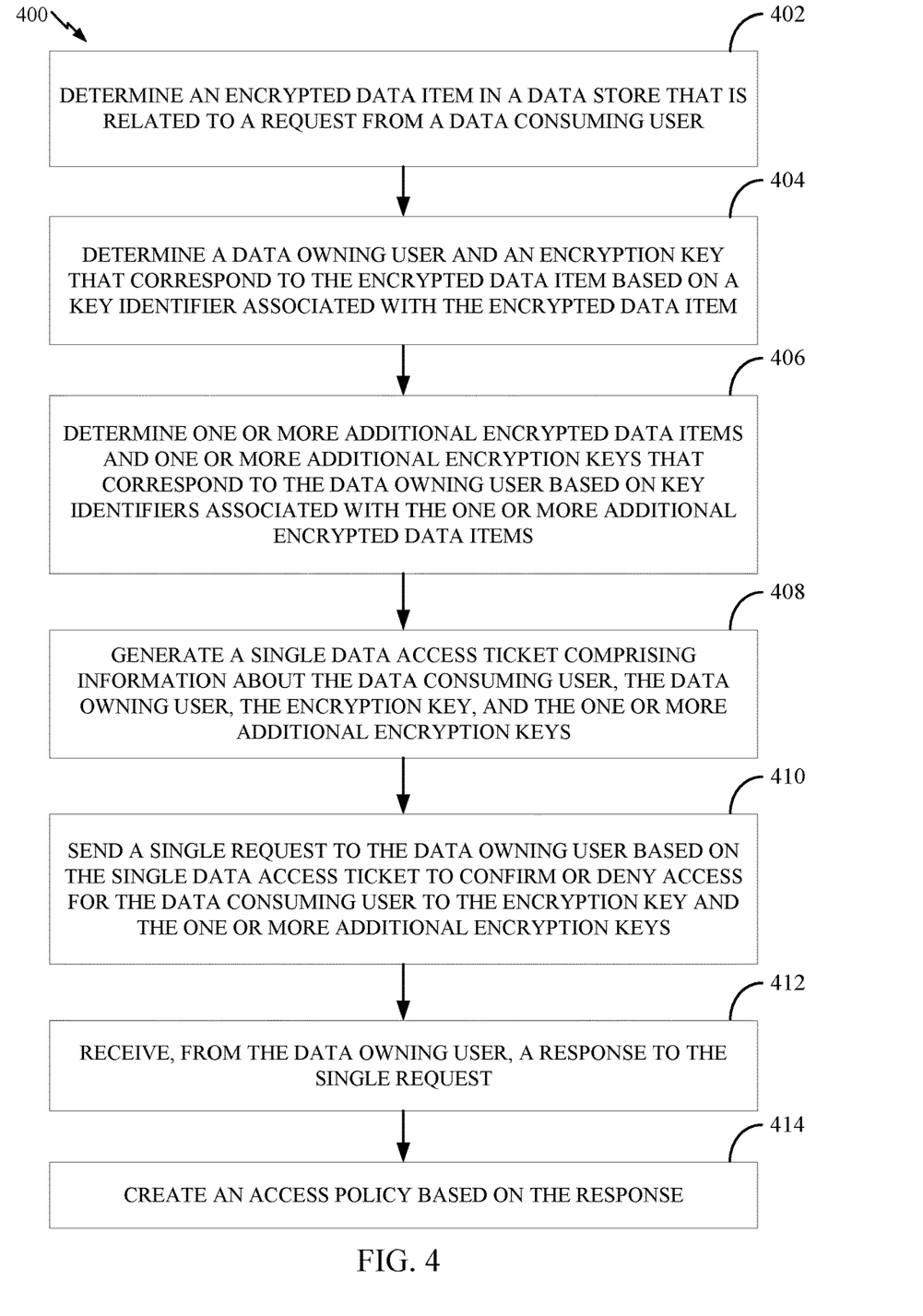
FIG. 4 depicts example operations related to encrypted data management.

FIG. 4 depicts example operations 400 for encrypted data management. For example, operations 400 may be performed by one or more components of server 120 and/or clients 130 and/or 140 of FIG. 1.

Operations 400 begin at step 402, with determining an encrypted data item in a data store that is related to a request from a data consuming user. In some cases, the data store is scanned by a plurality of nodes in parallel based on the request (e.g., the request may be for one or more specific data items and/or may be a general request to scan the data store for encrypted data items), and a master node aggregates a plurality of key identifiers determined by other nodes based on scanning subsets of the data store.

Operations 400 continue at step 404, with determining a data owning user and an encryption key that correspond to the encrypted data item based on a key identifier associated with the encrypted data item.

Operations 400 continue at step 406, determining one or more additional encrypted data items and one or more additional encryption keys that correspond to the data owning user based on key identifiers associated with the one or more additional encrypted data items.

Operations 400 continue at step 408, with generating a single data access ticket comprising information about the data consuming user, the data owning user, the encryption key, and the one or more additional encryption keys. In an example, generating the single data access ticket comprises interacting with an application programming interface (API) associated with a data access ticket system.

Operations 400 continue at step 410, with sending a single request to the data owning user based on the single data access ticket to confirm or deny access for the data consuming user to the encryption key and the one or more additional encryption keys.

Operations 400 continue at step 412, with receiving, from the data owning user, a response to the single request. The single data access ticket may be updated based on the response.

Operations 400 continue at step 414, with creating an access policy based on the response. In an example, creating the access policy comprises configuring a component of a device associated with the data consuming user to implement the access policy. The data consuming user may access the encrypted data item or one of the one or more additional encrypted data items based on the access policy.

Some embodiments further comprise determining one or more different encrypted data items in the data store that are related to the request, wherein the one or more different encrypted data items are associated with a different data owning user and one or more different encryption keys, and generating a different data access ticket comprising information about the data consuming user, the different data owning user, and the one or more different encryption keys. Certain embodiments further comprise storing the key identifier in association with the encrypted data item at a time the encrypted data item is added to the data store. The key identifier may, for example, be a unique identifier that is six bytes in length.

Example Computing Systems

Figure 5A:
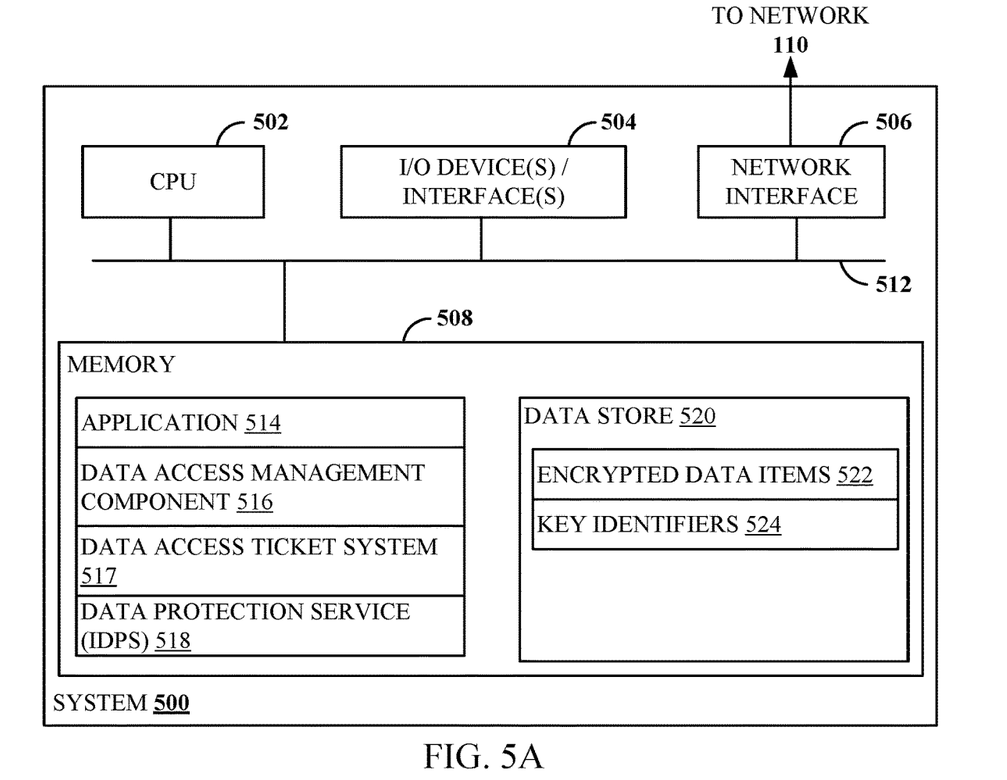
FIGS. 5A and 5B depict example processing systems for encrypted data management.

FIG. 5A illustrates an example system 500 with which embodiments of the present disclosure may be implemented. For example, system 500 may be representative of server 120 of FIG. 1.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, and an interconnect 512. It is contemplated that one or more components of system 500 may be located remotely and accessed via a network 110 (e.g., which may be network 110 of FIG. 1). It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes application 514, data access management component 516, data access ticket system 517, DPS 518, and data store 520 including encrypted data items 522 and key identifiers 524 which may be representative of application 122, data access management component 124, data access ticket system 126, DPS 128, data store 140, encrypted data items 148, and key identifiers 149 of FIG. 1. While data store 520 is depicted in local storage of system 500, it is noted that data store 520 may also be located remotely (e.g., at a location accessible over a network, such as the Internet).

Figure 5B:
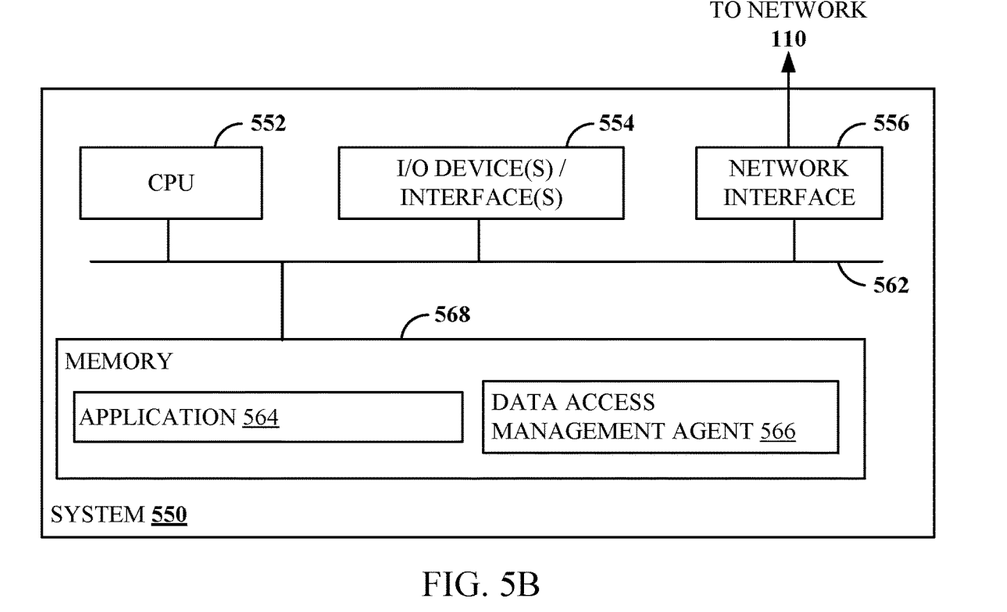

FIG. 5B illustrates another example system 550 with which embodiments of the present disclosure may be implemented. For example, system 550 may be representative of client 130 and/or client 140 of FIG. 1.

System 550 includes a central processing unit (CPU) 552, one or more I/O device interfaces 554 that may allow for the connection of various I/O devices 554 (e.g., keyboards, displays, mouse devices, pen input, etc.) to the system 550, network interface 556, a memory 558, and an interconnect 552. It is contemplated that one or more components of system 550 may be located remotely and accessed via a network 110 (e.g., which may be network 110 of FIG. 1). It is further contemplated that one or more components of system 550 may comprise physical components or virtualized components.

CPU 552 may retrieve and execute programming instructions stored in the memory 558. Similarly, the CPU 552 may retrieve and store application data residing in the memory 558. The interconnect 552 transmits programming instructions and application data, among the CPU 552, I/O device interface 554, network interface 556, and memory 658. CPU 552 is included to be representative of a single CPU, multiple CPUs, a single CPU having multiple processing cores, and other arrangements.

Additionally, the memory 558 is included to be representative of a random access memory. In some embodiments, memory 558 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 558 includes an application 564, which may be representative of a client-side component (e.g., application 132 of FIG. 1) corresponding to the server-side application 514 of FIG. 5A. For example, application 564 may comprise a user interface through which a user of system 550 interacts with application 514 of FIG. 5A. In alternative embodiments, application 514 is a standalone application that performs behavior prediction as described herein. Memory 558 further comprises data access management agent 566, which may correspond to data access management agent 134 of FIG. 1.

Example Clauses

Clause 1: A method for encrypted data management, comprising: determining an encrypted data item in a data store that is related to a request from a data consuming user; determining a data owning user and an encryption key that correspond to the encrypted data item based on a key identifier associated with the encrypted data item; determining one or more additional encrypted data items and one or more additional encryption keys that correspond to the data owning user based on key identifiers associated with the one or more additional encrypted data items; generating a single data access ticket comprising information about the data consuming user, the data owning user, the encryption key, and the one or more additional encryption keys; sending a single request to the data owning user based on the single data access ticket to confirm or deny access for the data consuming user to the encryption key and the one or more additional encryption keys; receiving, from the data owning user, a response to the single request; and creating an access policy based on the response.

Claim 2: The method of Clause 1, further comprising updating the single data access ticket based on the response.

Clause 3: The method of any one of Clause 1-2, further comprising accessing, by the data consuming user, the encrypted data item or one of the one or more additional encrypted data items based on the access policy.

Clause 4: The method any one of Clause 1-3, further comprising: determining one or more different encrypted data items in the data store that are related to the request, wherein the one or more different encrypted data items are associated with a different data owning user and one or more different encryption keys; and generating a different data access ticket comprising information about the data consuming user, the different data owning user, and the one or more different encryption keys.

Clause 5: The method of any one of Clause 1-4, wherein creating the access policy comprises configuring a component of a device associated with the data consuming user to implement the access policy.

Clause 6: The method of any one of Clause 1-5, wherein generating the single data access ticket comprises interacting with an application programming interface (API) associated with a data access ticket system.

Clause 7: The method of any one of Clause 1-6, further comprising storing the key identifier in association with the encrypted data item at a time the encrypted data item is added to the data store.

Clause 8: The method of any one of Clause 1-7, wherein the key identifier is a unique identifier that is six bytes in length.

Clause 9: A method for encrypted data management, comprising: receiving a request from a data consuming user to scan a data store for encrypted data; scanning the data store by a plurality of nodes in parallel based on the request; determining a data owning user and a plurality of encryption keys that correspond to a plurality of encrypted data items based on key identifiers determined during the scanning; generating a single data access ticket comprising information about the data consuming user, the data owning user, and the plurality of encryption keys; sending a single request to the data owning user based on the single data access ticket to confirm or deny access for the data consuming user to the plurality of encryption keys; receiving, from the data owning user, a response to the single request; and creating an access policy based on the response.

Clause 10: The method of Clause 9, wherein scanning the data store by the plurality of nodes in parallel based on the request comprises aggregating, by a master node of the plurality of nodes, a plurality of key identifiers determined by other nodes of the plurality of nodes based on scanning subsets of the data store.

Clause 11: The method of any one of Clause 9-10, further comprising updating the single data access ticket based on the response.

Clause 12: The method of any one of Clause 9-11, further comprising accessing, by the data consuming user, the encrypted data item or one of the one or more additional encrypted data items based on the access policy.

Clause 13: A system, comprising: one or more processors; and a memory comprising instructions that, when executed by the one or more processors, cause the system to: determine an encrypted data item in a data store that is related to a request from a data consuming user; determine a data owning user and an encryption key that correspond to the encrypted data item based on a key identifier associated with the encrypted data item; determine one or more additional encrypted data items and one or more additional encryption keys that correspond to the data owning user based on key identifiers associated with the one or more additional encrypted data items; generate a single data access ticket comprising information about the data consuming user, the data owning user, the encryption key, and the one or more additional encryption keys; send a single request to the data owning user based on the single data access ticket to confirm or deny access for the data consuming user to the encryption key and the one or more additional encryption keys; receive, from the data owning user, a response to the single request; and create an access policy based on the response.

Clause 14: The system of Clause 13, wherein the instructions, when executed by the one or more processors, further cause the system to update the single data access ticket based on the response.

Clause 15: The system of any one of Clause 13-14, wherein the instructions, when executed by the one or more processors, further cause the system to access, by the data consuming user, the encrypted data item or one of the one or more additional encrypted data items based on the access policy.

Clause 16: The system of any one of Clause 13-15, wherein the instructions, when executed by the one or more processors, further cause the system to: determine one or more different encrypted data items in the data store that are related to the request, wherein the one or more different encrypted data items are associated with a different data owning user and one or more different encryption keys; and generate a different data access ticket comprising information about the data consuming user, the different data owning user, and the one or more different encryption keys.

Clause 17: The system of any one of Clause 13-16, wherein creating the access policy comprises configuring a component of a device associated with the data consuming user to implement the access policy.

Clause 18: The system of any one of Clause 13-17, wherein generating the single data access ticket comprises interacting with an application programming interface (API) associated with a data access ticket system.

Clause 19: The system of any one of Clause 13-18, wherein the instructions, when executed by the one or more processors, further cause the system to store the key identifier in association with the encrypted data item at a time the encrypted data item is added to the data store.

Clause 20: The system of any one of Clause 13-19, wherein the key identifier is a unique identifier that is six bytes in length.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for encrypted data management, comprising:
   determining an encrypted data item in a data store that is related to a request from a data consuming user;
   determining a data owning user and an encryption key that correspond to the encrypted data item based on a key identifier associated with the encrypted data item;
   determining one or more additional encrypted data items and one or more additional encryption keys that correspond to the data owning user based on key identifiers associated with the one or more additional encrypted data items;
   generating a single data access ticket comprising information about the data consuming user, the data owning user, the encryption key, and the one or more additional encryption keys;
   sending a single request to the data owning user based on the single data access ticket to confirm or deny access for the data consuming user to the encryption key and the one or more additional encryption keys;
   receiving, from the data owning user, a response to the single request; and
   creating an access policy based on the response.

2. The method of claim 1, further comprising updating the single data access ticket based on the response.

3. The method of claim 1, further comprising accessing, by the data consuming user, the encrypted data item or one of the one or more additional encrypted data items based on the access policy.

4. The method of claim 1, further comprising:
   determining one or more different encrypted data items in the data store that are related to the request, wherein the one or more different encrypted data items are associated with a different data owning user and one or more different encryption keys; and
   generating a different data access ticket comprising information about the data consuming user, the different data owning user, and the one or more different encryption keys.

5. The method of claim 1, wherein creating the access policy comprises configuring a component of a device associated with the data consuming user to implement the access policy.

6. The method of claim 1, wherein generating the single data access ticket comprises interacting with an application programming interface (API) associated with a data access ticket system.

7. The method of claim 1, further comprising storing the key identifier in association with the encrypted data item at a time the encrypted data item is added to the data store.

8. The method of claim 1, wherein the key identifier is a unique identifier that is six bytes in length.

9. A method for encrypted data management, comprising:
   receiving a request from a data consuming user to scan a data store for encrypted data;
   scanning the data store by a plurality of nodes in parallel based on the request;
   determining a data owning user and a plurality of encryption keys that correspond to a plurality of encrypted data items based on key identifiers determined during the scanning;
   generating a single data access ticket comprising information about the data consuming user, the data owning user, and the plurality of encryption keys;
   sending a single request to the data owning user based on the single data access ticket to confirm or deny access for the data consuming user to the plurality of encryption keys;
   receiving, from the data owning user, a response to the single request; and
   creating an access policy based on the response.

10. The method of claim 9, wherein scanning the data store by the plurality of nodes in parallel based on the request comprises aggregating, by a master node of the plurality of nodes, a plurality of key identifiers determined by other nodes of the plurality of nodes based on scanning subsets of the data store.

11. The method of claim 9, further comprising updating the single data access ticket based on the response.

12. The method of claim 9, further comprising accessing, by the data consuming user, the encrypted data item or one of the one or more additional encrypted data items based on the access policy.

13. A system, comprising:
   one or more processors; and
   a memory comprising instructions that, when executed by the one or more processors, cause the system to:
      determine an encrypted data item in a data store that is related to a request from a data consuming user;
      determine a data owning user and an encryption key that correspond to the encrypted data item based on a key identifier associated with the encrypted data item;
      determine one or more additional encrypted data items and one or more additional encryption keys that correspond to the data owning user based on key identifiers associated with the one or more additional encrypted data items;

generate a single data access ticket comprising information about the data consuming user, the data owning user, the encryption key, and the one or more additional encryption keys;

send a single request to the data owning user based on the single data access ticket to confirm or deny access for the data consuming user to the encryption key and the one or more additional encryption keys;

receive, from the data owning user, a response to the single request; and create an access policy based on the response.

14. The system of claim 13, wherein the instructions, when executed by the one or more processors, further cause the system to update the single data access ticket based on the response.

15. The system of claim 13, wherein the instructions, when executed by the one or more processors, further cause the system to access, by the data consuming user, the encrypted data item or one of the one or more additional encrypted data items based on the access policy.

16. The system of claim 13, wherein the instructions, when executed by the one or more processors, further cause the system to:

determine one or more different encrypted data items in the data store that are related to the request, wherein the one or more different encrypted data items are associated with a different data owning user and one or more different encryption keys; and generate a different data access ticket comprising information about the data consuming user, the different data owning user, and the one or more different encryption keys.

17. The system of claim 13, wherein creating the access policy comprises configuring a component of a device associated with the data consuming user to implement the access policy.

18. The system of claim 13, wherein generating the single data access ticket comprises interacting with an application programming interface (API) associated with a data access ticket system.

19. The system of claim 13, wherein the instructions, when executed by the one or more processors, further cause the system to store the key identifier in association with the encrypted data item at a time the encrypted data item is added to the data store.

20. The system of claim 13, wherein the key identifier is a unique identifier that is six bytes in length.

* * * * *